(12) United States Patent
Sturm

(10) Patent No.: US 6,581,114 B1
(45) Date of Patent: Jun. 17, 2003

(54) METHOD AND SYSTEM FOR SYNCHRONIZING SERIAL DATA

(75) Inventor: Gordon L. Sturm, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 319 days.

(21) Appl. No.: 09/615,993

(22) Filed: Jul. 14, 2000

(51) Int. Cl.[7] .............................................. G06F 13/00
(52) U.S. Cl. ....................... 710/100; 713/400; 714/3; 714/44; 714/48; 714/701; 714/775; 714/781
(58) Field of Search ................... 710/100, 300, 710/106; 713/401, 400; 714/44, 3, 25, 45, 701, 704, 707, 715, 746, 752, 758, 775, 781

(56) References Cited

U.S. PATENT DOCUMENTS

| | | | |
|---|---|---|---|
| 3,755,789 A | * 8/1973 | Collins | 713/401 |
| 4,002,845 A | * 1/1977 | Kaul et al. | 370/509 |
| 4,004,100 A | * 1/1977 | Takimoto | 370/515 |
| 4,132,867 A | * 1/1979 | Siglow | 370/512 |
| 4,370,648 A | * 1/1983 | Wagner et al. | 340/825.2 |
| 4,486,739 A | 12/1984 | Franaszek et al. | 340/347 DD |
| 5,751,975 A | 5/1998 | Gillespie et al. | 395/306 |
| 5,764,924 A | 6/1998 | Hong | 395/281 |
| 5,875,313 A | 2/1999 | Sescila, III et al. | 395/309 |
| 5,887,039 A | 3/1999 | Suemura et al. | 375/365 |
| 5,937,175 A | 8/1999 | Sescila, III et al. | 395/309 |
| 5,940,018 A | 8/1999 | Kim et al. | 341/94 |
| 5,968,144 A | 10/1999 | Walker et al. | 710/28 |
| 5,968,172 A | 10/1999 | Aleshi | 713/1 |
| 6,003,105 A | 12/1999 | Vicard et al. | 710/129 |
| 6,070,214 A | 5/2000 | Ahern | 710/128 |
| 6,092,213 A | * 7/2000 | Lennie et al. | 714/3 |
| 6,311,294 B1 | * 10/2001 | Larky et al. | 714/44 |

OTHER PUBLICATIONS

Main, Kevin, Texas Instruments, Inc. "WinHEC Presentation", Presented circa Apr. 2000.
Texas Instruments, Inc. "Serial PCI–to–PCI Bridge Technology ", Presented circa Jun. 2000.

* cited by examiner

*Primary Examiner*—Gopal C. Ray
*Assistant Examiner*—Justin King
(74) *Attorney, Agent, or Firm*—J. Dennis Moore; W. James Brady, III; Frederick J. Telecky, Jr.

(57) ABSTRACT

A first embodiment of the present invention includes a decoder 320 and a detection circuit 330. The decoder 320 receives data at a packet rate. Each packet includes more than one word so that the packet rate is less than a word rate. The detector circuit 330 monitors a data valid signal from the decoder 320 and asserts an output signal (send idle) upon determination that the data valid signal changes values at a rate higher than the packet rate.

25 Claims, 3 Drawing Sheets

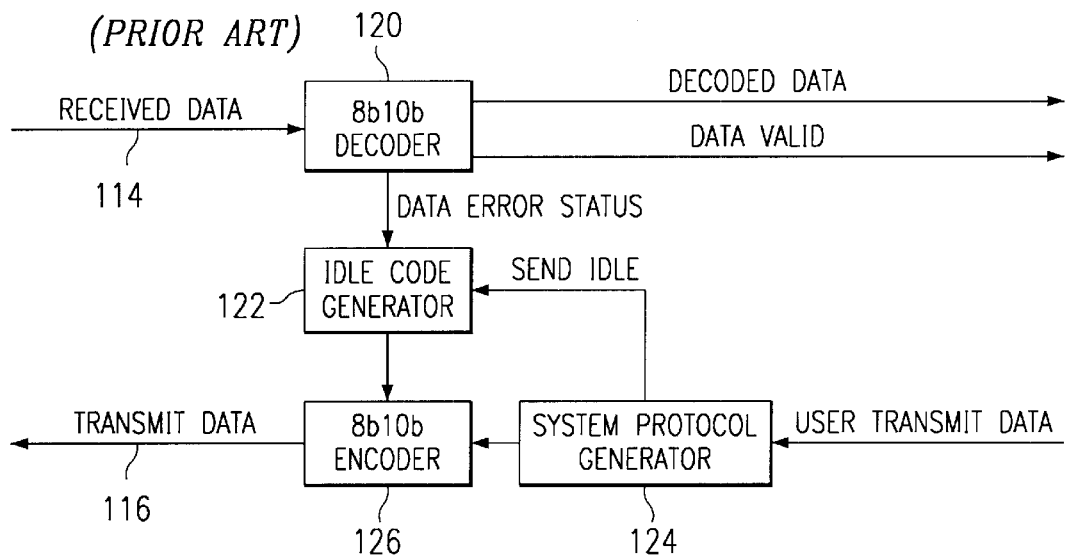
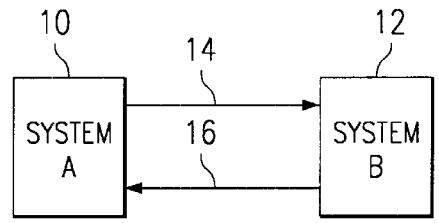
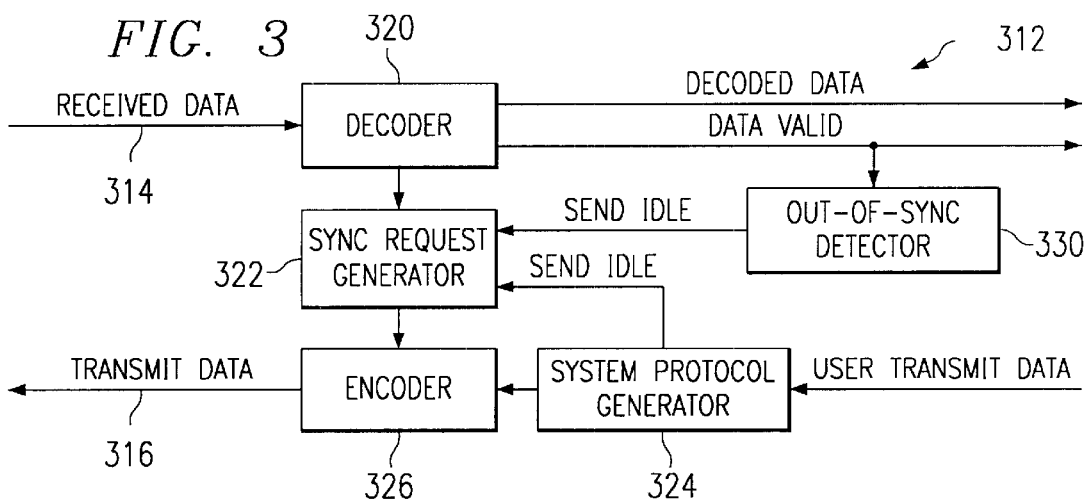

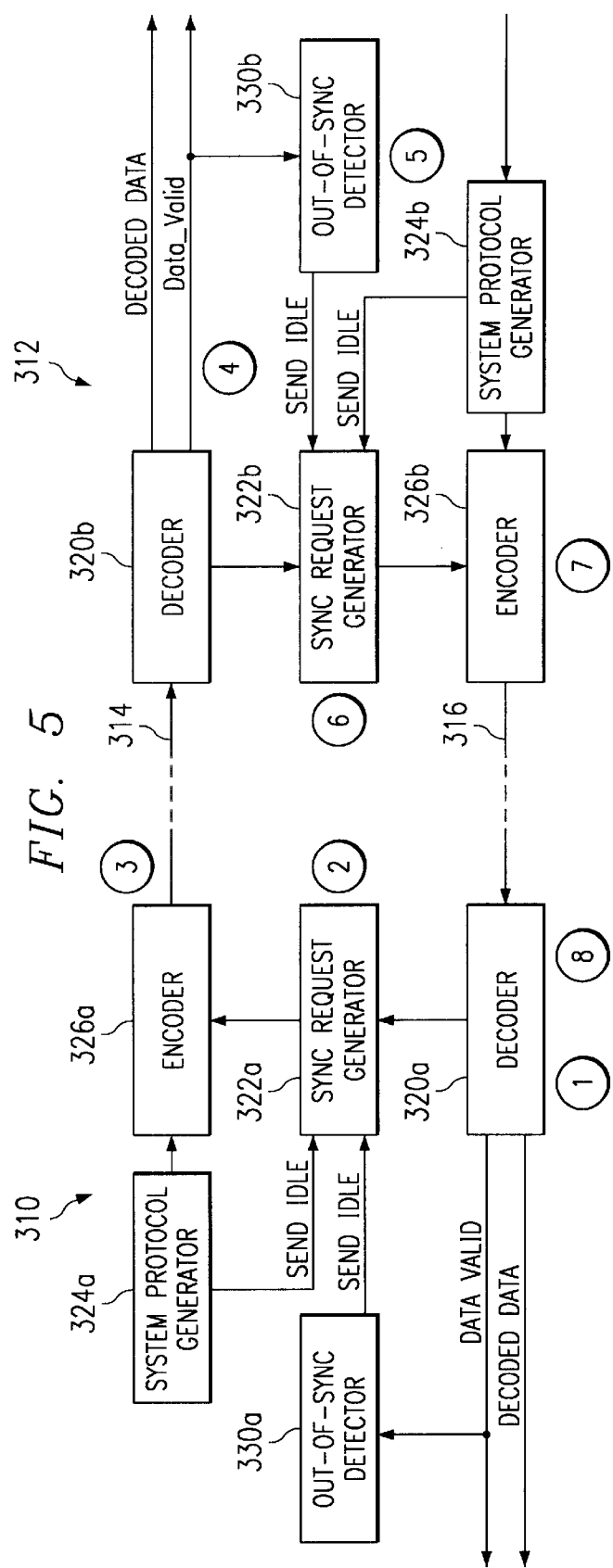

METHOD AND SYSTEM FOR SYNCHRONIZING SERIAL DATA

The present invention is related to commonly-assigned U.S. patent application Ser. No. 09/616,105, filed concurrently herewith, which is incorporated herein by reference as if repeated in its entirety.

FIELD OF THE INVENTION

This invention relates generally to communication systems and components and specifically to a method and system for synchronizing serial data.

BACKGROUND OF THE INVENTION

The present invention deals with communication systems. Serial communication utilizes a single communication path to transmit data from a first point to a second point. When multi-bit words are communicated, they can be transmitted one after the other along the serial line. It is then up to the receiver to discern which bits belong to each word. This sorting process can be referred to as resynchronization.

FIG. 1 shows part of the resynchronization logic in a prior art serial communications system. The resynchronization logic shown in FIG. 1 will be present in each of two units communicating with one another. The transmitted data 114 of one such unit will be the same as the received data 116 of the other unit. The received data is provided to 8b10b decoder 120. As known in the art, an 8b10b code is a code that translates an 8-bit data word into a 10-bit word for communications. For data, this block converts the 10 bits of received data into the originally transmitted 8 bits and outputs this as decoded data. Decoder 120 also asserts the Data Valid signal when valid data is found.

Decoder 120 provides a Data Error signal to idle code generator 122. The Data Error signal is asserted when an unrecognized word is received by decoder 120. Upon this occurrence, idle code generator 122 will instruct 8b10b encoder 126 to transmit an idle code. The encoder 126 will also send an idle code at predetermined times determined by the system protocol. This transmission is initiated by system protocol generator 124, which sends an indication to send an idle code to idle code generator 122.

In order to support this recovery method, the transmitter effectively echoes the data-error status from the receiver, sending either a valid data code—group back to the receiver side or sending a valid special code-group back to the receiver side. In the receiver, these received code-groups are characterized and a data-valid signal is developed that represents whether the code-groups from the transmitter are data or special codes. One aspect of the prior art that is utilized by the preferred embodiment of the present invention is that the system protocol generator 124 sends idle codes or user data in packet size chunks, not anything smaller.

SUMMARY OF THE INVENTION

The preferred embodiment of the present invention utilizes this feature of the prior art to search for idle codes or data that has been transmitted in a chunk that is less than a full packet size. If such a transmission is found, the system can determine that an error exists and act appropriately to correct this error. For example, it may be likely that the serial data is not properly synchronized and the system must act to correct this problem.

As a first example, FIG. 3 illustrates a first embodiment system 312 of the present invention. In the prior art system of FIG. 1, out-of-sync data will frequently be interpreted as an invalid code-group by the 8b10b decoder 120 in the receiver, generating a data-error signal, which fluctuates almost randomly at the data word rate.

As a first example, FIG. 3 illustrates a first embodiment system 312 of the present invention. In the prior art system of FIG. 1, out-of-sync data will frequently be interpreted as an invalid code-group by the 8b10b decoder 120 in the receiver, generating a data-error signal, which fluctuates almost randomly at the data word rate.

Similar to FIG. 1, the first embodiment 312 of the present invention will be present in each of two units communicating with one another. The transmitted data 316 of one such unit will be the same as the received data 314 of the other unit. The first embodiment 312 utilizes an out-of-sync detector circuit 330 that monitors the data-valid line from the receiver. FIG. 3 shows a block diagram of this embodiment of the invention. Elements 320, 322, 324 and 326 can be similar to the analogous elements 120, 122, 124 and 126 described with respect to FIG. 1. Therefore, any description of those elements would also apply to the FIG. 3 description.

Different aspects of the present invention provide a number of advantages over other possible techniques. For example, with the preferred embodiment of the present invention is not necessary to send comma codes frequently, or even at all. Further, it is not necessary to embed check words into the user data sequence to determine if it was suffering errors. Although there is nothing in the present invention that precludes these additional checks, serial link bandwidth can be saved by limiting the additional bits. Since serial link bandwidth is not used during normal operation to monitor the link integrity, more link bandwidth is available for the system performance.

Further, the preferred embodiment implementation does not require disturbing existing packet protocols or data formats, and it does not require sending extra codes to monitor the data integrity of the serial link. This preferred method essentially recognizes the increased signaling bandwidth used by the system when it goes out-of-sync. In the vast majority of cases, existing packet protocols are not disturbed by utilizing this invention. This permits modular design practice where the packetization can be developed independently of the lower level link maintenance functions of the design. The preferred embodiment of the invention simply expects normal system operation to have a minimum packet size greater than one data word, a very easy constraint to meet.

BRIEF DESCRIPTION OF THE DRAWINGS

The above features of the present invention will be more clearly understood from consideration of the following descriptions in connection with accompanying drawings in which:

FIG. 1 shows part of the resynchronization logic in a prior art serial communications system;

FIG. 2 provides a very simple view of a communication system;

FIG. 3 shows part of the resynchronization logic in a first embodiment serial communications system of the present invention;

FIG. 4 shows a preferred embodiment out-of-sync detector;

FIG. 5 shows a bi-directional communication system of the present invention;

DETAILED DESCRIPTION OF ILLUSTRATIVE EMBODIMENTS

Figure 6:
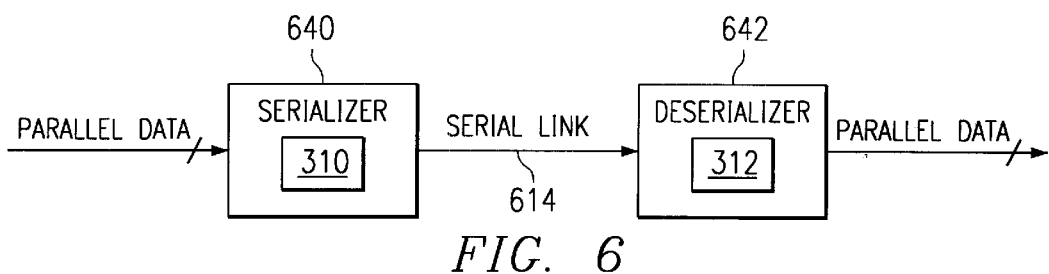
FIG. 6 shows a system for transmitting parallel data across a serial link.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Aspects of the present invention can be utilized in systems that rely on the use of high-speed serial data transmission. This type of data transmission is cost effective, but creates certain design problems.

One common design problem is clock recovery. For maximum data throughput, many systems construct the serial data stream by sending a continuous stream of data bits drawn from each byte of data, with no space between them. The following example shows the concept. Suppose three words are to be sent as serial data.

| Word number | Data (Hex) | Data (Binary) |
| --- | --- | --- |
| 1 | 57 | 0101 0111 |
| 2 | A1 | 1010 0001 |
| 3 | F2 | 1111 0010 |

When these three data words are sent as raw data, the serial data stream could look like:

0101011110100001111110010

In this case each word has been serialized starting with the leftmost bit, continuing to the rightmost bit, then moving on to the leftmost bit of the next word. No extra bits are sent to indicate the location of word boundaries.

Often, a received clock is recovered from the serial data by recognizing the transitions between a zero data bit and a one data bit. This method conserves bandwidth on the serial line, but also depends on the data having a sufficient mixture of ones and zeros to provide enough transitions to satisfy the design of the clock recovery circuits.

To ensure an adequate supply of bit transitions between zero and one, a special code, called "8b10b" code, is sometimes employed. This code converts any 8 bit pattern of data into a 10 bit data word, guaranteeing that there will be no more than four zeros or four ones in a row before a bit of the opposite polarity.

Even with the use of 8b10b code, the receiver still requires some auxiliary mechanism to identify the boundaries of the data words. To meet this requirement, certain special code words are defined in the 8b10b code. These are called "comma" codes. The comma codes, which are not part of the user data code space, each have a run of five ones or five zeros in the code word. The long run can be recognized without regard to word boundary synchronization, and once recognized, it can be used to determine correct word boundary synchronization. When 8b10b code is used, comma codes are sent occasionally to maintain word synchronization.

Loss of synchronization can occur when data bit errors convert one or more normal data words into the same bit pattern as a comma code. If some shifted version of the data with errors matches the 8b10b comma code, the receiver's synchronization logic may recognize the false comma code and adjust the word boundaries to match it. The word boundaries so defined are not correct for normal data, but the receiver does not know this. It starts delivering data words composed of a shifted combination of one word and the next.

This situation will continue until the receiver sees a deliberately sent comma code. When a comma is deliberately sent, its bit pattern is properly aligned with the correct word boundaries. This correct comma word will realign the receiver word boundaries to the correct position in the data stream. After the realignment, the receiver once again delivers correct data words.

One very simple method of ensuring word synchronization is to send comma codes very frequently. The disadvantage of this method is that the data bandwidth consumed by the comma codes cannot be used to send user data. In effect the throughput of the system is reduced.

Once loss of synchronization is sensed, it can be corrected by simply sending a comma code though the system. Thus, some methods of maintaining synchronization depend on sensing the loss of synchronization. One classic method of sensing loss of word synchronization is to use a suitable check bit scheme. Words are grouped into blocks and each block includes extra data bits representing a cyclic redundancy check code of the data words of the block. The check code is designed so that incorrect word boundaries will result in an incorrect check code.

There are several disadvantages to this method. First, data bandwidth is consumed by the check bits and therefore the throughput of the system is reduced. It is also difficult to compute and verify the check bits. In addition, there is a delay in discovering loss of synchronization. As a result, the problem cannot be recognized until the end of the data block, where the check bits can be compared to their expected value.

FIG. 2 provides a very simple view of a communication system. This system uses full duplex serial data with 8b10b encoding. In other words, system A (reference numeral 10) can send serial data to system B (reference numeral 12) along serial link 14 while system B sends serial data to system A along serial link 16. Preferably, the system is fully symmetric and, with this preference in mind, the transmission and receiver circuits 10 and 12 may include substantially identical circuitry. As will be seen, the general block diagram can apply to both prior art systems and systems that utilize the present invention.

The system can either send user data or special codes, such as an idle code, on the serial line 14 (16). It sends data by using data code-groups from the 8b10b code, and it sends an idle pattern by using one of the special code-groups of the 8b10b code. IEEE Standard 802.3, §36.2.4 provides details of the 8b10b code. Rather than repeat the information provided in the standard here, IEEE Standard 802.3 is incorporated herein by reference.

When this system sends either data or idle codes, it does so in multiples of several code-groups, called packets. When the system receives data, it characterizes the received code-groups as belonging either to the set of data code-groups or the set of special code-groups in the 8b10b code. The receiver supplies a data-valid signal along with the decoded data, indicating whether the received data was in the set of data code-groups, or special code-groups. Because the data or idle codes are sent in multiples of a packet size, the data-valid signal only changes at the packet rate, which is a fraction of the word rate of the system.

The receiver also supplies an error signal indicating if the received code-groups belonged to any valid code-group of the 8b10b code. The 8b10b code defines valid code-groups for about fifty-two percent of the total code space, so the chance of recognizing a random data word as a valid code group is about fifty-fifty.

Suppose the receiver on the B side loses word synchronization. It will interpret its received data as being nearly random and therefore heavily errored. The correct response to this situation is for the A side transmitter to send an 8b10b comma code-group to the B side receiver. This comma code will be recognized by the B side receiver and will cause it to re-align its word boundaries correctly.

In one aspect, this invention is part of a practical communication system that uses the 8b10b code and higher level protocols to transfer packets of data bidirectionally between System A and System B. The higher level protocols operate with some of the 8b10b special code-groups, so that arbitrary user data may pass through the system without mimicking system protocol information.

In one aspect, this invention provides a simple way for this system to process the data-valid signal to recognize when the system at the other end of the link has lost word synchronization.

As a first example, FIG. 3 illustrates a first embodiment system of the present invention. In the prior art system of FIG. 1, out-of-sync data will frequently be interpreted as an invalid code-group by the 8b10b decoder 120 in the receiver 112 (110), generating a data-error signal, which fluctuates almost randomly at the data word rate.

The fluctuating data-error signal causes the transmitter 110 (112) to send a data stream with similar fluctuations between valid data and idle codes. When this data stream is received, the data-valid signal represents essentially the same random pattern of fluctuations as the data-error status in the far side receiver. In effect, the prior art system converts rapid fluctuations of its data-error line into similar rapid fluctuations of the data-valid line at the far end of the link.

The first embodiment of the present invention utilizes an out-of-sync detector circuit 330 that monitors the data-valid line from the receiver. FIG. 3 shows a block diagram of this embodiment of the invention. Elements 320, 322, 324 and 326 can be similar to the analogous elements 120, 122, 124 and 126 described with respect to FIG. 1. Therefore, any description of those elements would also apply to the FIG. 3 description.

In this embodiment, the out-of-sync detector 330 processes the data-valid signal from incoming words. If the data-valid signal changes relatively slowly (e.g., at the packet rate of the system or less) normal data flow is likely taking place. If, on the other hand, the data-valid signal changes more rapidly, e.g., at the word rate of the system, the far end receiver is very likely out of synchronization. In this situation, the out-of-sync detector 330 signals the transmitter at this end to send it comma code, thereby resynchronizing the far end receiver.

In the prior art system described with respect to FIG. 1, the idle code is a comma code. As a result, in a system designed to replace that of FIG. 1, it is sufficient to request an idle code be sent. In other systems, other synchronization indications can be transmitted.

In this aspect of the invention, the occurrence of short pulses of activity on the data-valid line is the key indicator of an out-of-sync condition at the far end of the link.

FIG. 4 illustrates a circuit implementing the out-of-sync detector 330. The circuit 330 works with a shift register 332 to capture a running record of activity on the data-valid line, and a short pulse decoder circuit 334. In the simplest implementation, the shift register 330 is three stages long, and the short pulse decoder 334 asserts the send idle signal upon an occurrence of either a 010 or a 101 pattern. Table 1 illustrates the decode table for a three stage shift register 332 and a packet size of at least two words.

TABLE 1

| Shift Register 332 Output | Send Idle Signal |
| --- | --- |
| 000 | 0 |
| 001 | 0 |
| 010 | 1 |
| 011 | 0 |
| 100 | 0 |
| 101 | 1 |
| 110 | 0 |
| 111 | 0 |

Either of these patterns indicates activity on the data-valid line that is only one word clock long. The system 310 or 312 that uses this invention does not have such short protocols and therefore such a short pulse most likely indicates the presence of random looking receive data at the far end receiver, an indication of loss of word synchronization at the far end of the link.

Architecturally, the circuit could be viewed as a finite impulse response high-pass digital filter, which detects the high frequency content of the data-valid signal when the system interprets data in an out-of-sync condition.

The three stage shift register 332 should be effective for any system protocol where the packet size is two words or greater. If the packet size is greater than two words, a longer shift register can be used. For example, if the packet size is three words or greater, decoder 334 can seek out sequences that have only one or two consecutive Data Valid assertions (1) or de-assertions (0). Table 2 summarizes the decoder output when configured with a four stage shift register 332 and a packet size of three or greater.

TABLE 2

| Shift Register 332 Output | Send Idle Signal |
| --- | --- |
| 0000 | 0 |
| 0001 | 0 |
| 0010 | 1 |
| 0011 | 0 |
| 0100 | 1 |
| 0101 | 1 |
| 0110 | 1 |
| 0111 | 0 |
| 1000 | 0 |
| 1001 | 1 |
| 1010 | 1 |
| 1011 | 1 |
| 1100 | 0 |
| 1101 | 1 |
| 1110 | 0 |
| 1111 | 0 |

A similar table can be generated for protocols that utilize larger packet sizes by seeking out sequences that include isolated sub-sequences that are shorter than the smallest packet size. Using a longer shift register will allow the system to more quickly determine that it is out of synchronization but also require a more complicated decoder. Therefore, the designer will need to determine whether the increase in time is worth the complexity.

Summarizing this aspect of the invention, the out-of-sync detector 330 searches for changes on the data valid line at a rate greater than the packet rate. In both Table 1 and Table 2, this is determined by searching for isolated strings of 1's or 0's with a length that is less than the number of words in a packet. In preparing these charts, it was assumed that any bit sequence (from the output of shift register 332) could be adjacent to any other bit sequence. If the protocol provides other constraints, then these may be factored into the decode table.

FIG. 5 illustrates a communication system that includes two transmitter/receiver systems 310 and 312 of the present invention. Either, and preferably both, of these systems include the same capabilities so that full duplex communication can be efficiently implemented.

As illustrated, the two systems 310 and 312 are coupled by two serial lines 314 and 316. In the preferred embodiment, the serial link 314/316 is a single-channel, bi-directional, point-to-point interface. Preferably, the serial link comprises a differential pair of wires 314 for communication from system 310 to system 312 and a second differential pair of wires 316 for communication from transceiver 312 to transceiver 310. Single-ended wires could alternatively be used. Data signals and control signals share the same line. In operation, the system's coding scheme is used to differentiate data from control. This type of configuration is convenient since it can utilize a standard category 5 cable, such as the cables used in regular Ethernet applications. In an alternate embodiment, the invention could be implemented with a single differential pair or single-ended wire in a half duplex system.

To assist in understanding the operation of the system, circled numbers have been included to demonstrate a preferred embodiment operation of the present invention. The following steps coincide with the circled numbers provided with FIG. 5.

(1) Decoder 320a receives information from serial line 316 and determines that synchronization has been lost. This lack of synchronization occurs, for example, when a valid data code word or a valid special code word is not received as expected. For example, if the packet size is three words long that at least three data words or three special code words should be received consecutively (since a single packet is either data or a special code but not both).

(2) At each error, a short idle code is generated. A short idle code is less than a full packet in length.

(3) The short idle codes are interspersed with data and transmitted from side A (310) to side B (312).

(4) The Data Valid signal is deasserted at each short idle. Since the short idle is less than a full packet in length, this action will cause the signal frequency on the Data Valid line to increase.

(5) Out-of-sync detector 330b recognizes the rapid changes in the Data Valid line and generates a command to resynchronize the other side, generally in the form of a send idle command.

(6) The synchronization request generator 322b generates a synchronization packet, e.g., a packet of idles, in response to the high frequency at the data valid line (as determined by out-of-sync detector 330b).

(7) The encoder 326b sends the synchronization packet.

(8) The synchronization packet is received by decoder 320a, which is now able to resynchronize.

To this point, the present invention has been described in the context of a 8b10b code. It is understood, however, that other codes could also utilize aspects of the present invention. For example, any code where a higher frequency error indication can be recognized could utilize this aspect of the present invention. Examples include Hamming codes, parity codes or any linear block code based on the system word size rather than the packet size.

The present invention can be utilized in a wide variety of contexts that require serial communication (over long or short distances). An example of one of these contexts is the communication of parallel data across a serial link. FIG. 6 illustrates an example where parallel data is provided to a serializer circuit 640 and converted to a serial data stream. The serial data stream is provided to serial link 614 and transmitted to deserializer 642, which can convert the serial data stream back into parallel data. While not illustrated as such, two serial links can be provided to allow for full duplex communication.

Both the serializer 640 and the deserializer 642 can include circuitry as illustrated in FIG. 3. This circuitry can, amongst other things, help keep the synchronization of the serial communication paths.

One application of the circuitry of FIG. 6 is in a computer system. An example of this type of application is provided in co-pending application Ser. No. 09/616,105, which is incorporated herein by reference. In its preferred embodiment, the co-pending application describes a computer system that utilizes a PCI-to-PCI bridge that includes a serial link.

Figure 7:
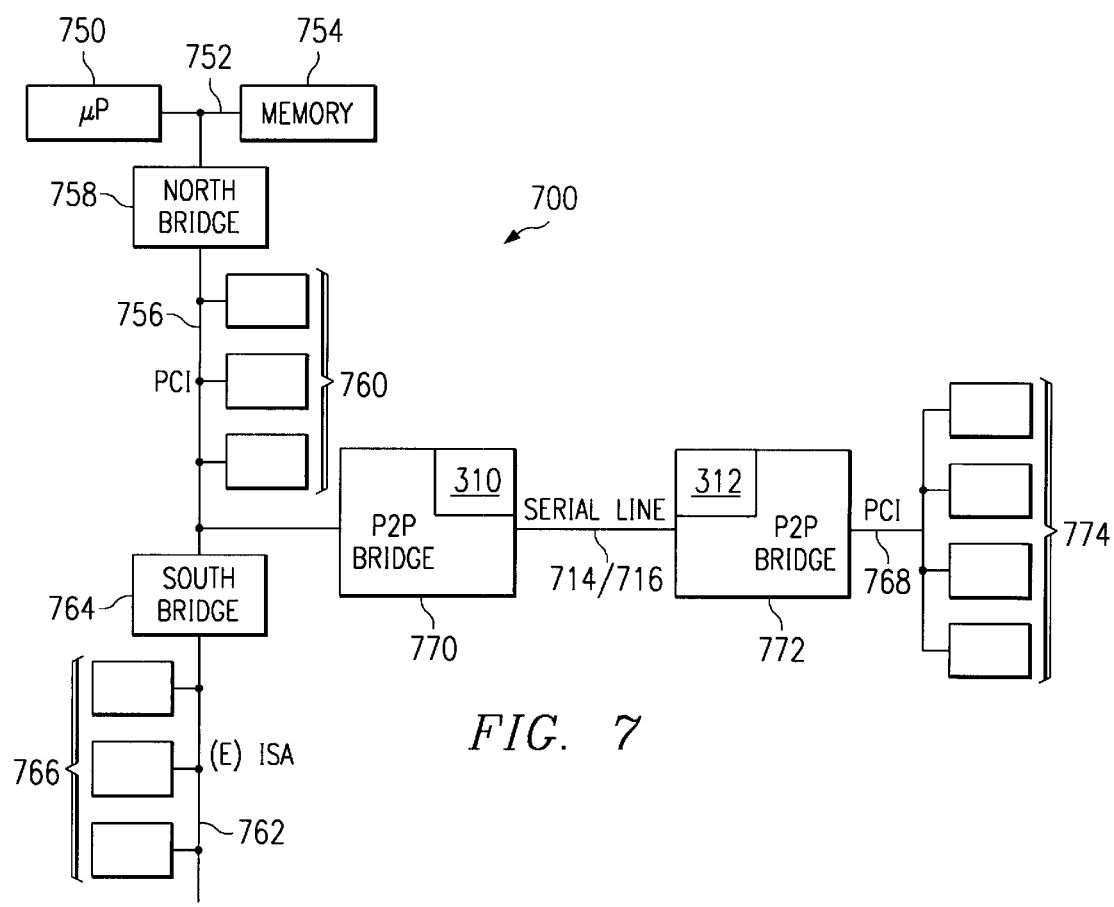
FIG. 7 shows a computer system that utilizes aspects of the present invention.

FIG. 7 illustrates a block diagram of a computer system 700 that may utilize aspects of the present invention. Processor 750 may be any of a number of processors such as an x86 compatible microprocessor or a Sparc microprocessor.

In this embodiment, the processor 750 is coupled to a processor bus 752, which is typically proprietary (e.g., not standardized) to the processor 750. The bus 752 is coupled to a memory system 754. The memory system 754 includes dynamic random access memory (DRAM) as well as associated control circuitry.

Processor bus 752 is also coupled to a PCI bus 756 through a bridge circuit 758, often referred to as a north bridge. In some instances, the memory control circuitry from memory system 754 and the bridge circuitry 758 are combined in a single chip. In this case, which is not illustrated, the north bridge 758 would be coupled between processor 752 and memory 754.

PCI bus 756 includes a number of slots 760 that can be used to couple various devices to the bus. For example, the slots could be used to coupled devices such as hard disk drives, modems, network interface cards, optical drives (e.g., CD ROM or DVD), or other devices.

PCI bus 756 is coupled to a second bus, typically a legacy bus such as an ISA or EISA bus 762, through a second bridge circuit 764, often referred to as a south bridge. The (E)ISA bus 762 includes slots 766 typically used for input/output devices such as the keyboard, mouse, display and other devices such as the non-volatile memory.

The PCI bus 756 is a standardized bus and therefore can include only a limited number of slots 760. If more slots are needed, a second PCI bus 768 can be coupled to the first PCI bus 756 through a PCI-to-PCI bridge circuit (P2P). In this case, the P2P circuit is implemented using two half bridge circuits 770 and 772 coupled together by a serial link 714. The secondary PCI bus 768 includes slots 774 that can be utilized in the same manner as slots 760. In fact, from the perspective of an operating system being executed on processor 750 primary PCI bus 756 and secondary PCI bus 768 appear to be a single PCI bus.

The P2P half bridge circuits 770 and 772 can each utilize the transmitter and receiver circuitry disclosed herein. For example, referring back to FIG. 5, the circuitry 310 can be included in P2P circuit 770 and the circuitry 312 can be included in P2P circuit 772. Of course, other circuits will also be included.

Although not illustrated here, the PCI-to-PCI bridge circuitry can be implemented as disclosed in the preferred embodiment of the co-pending application. For example, both P2P circuits 770 and 772 can include an interface device and a transceiver device, so that the bridge is implemented with four chips. A two chip embodiment, as shown in FIG. 7, is also envisioned.

The system of FIG. 7 can be employed in a variety of contexts. For example, the system might be a portable computer that can be coupled to a docking station. In this example, P2P bridge 770 could provide access from the notebook computer to the docking station through a cable 714/716. This connection is advantageous since the cable can be a standard category 5 cable.

The block diagram of FIG. 7 can also be utilized in other systems. For example, small-form-factor computers do not have room for much expansion. A cable interfaced to the exterior of the computer can be coupled to an expansion box that includes additional cards. Similarly, other computers that require remote expansion can utilize the benefits of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication device comprising:
    a decoder coupled to a received data input node, the decoder including a decoded data output and a data valid output, the decoder configured to receive data at a packet rate, each packet including more than one word so that the packet rate is less than a word rate; and
    a detector circuit with an input coupled to the data valid output of the decoder, the detector circuit asserting an output signal upon determination that a signal carried on the data valid output changes values at a rate higher than the packet rate.

2. The device of claim 1 and further comprising a synchronization request generator coupled to the detector circuit, the synchronization request generator generating a synchronization request in response to an assertion of the output signal by the detector circuit.

3. The device of claim 1 wherein the detector circuit includes a finite impulse response high-pass digital filter.

4. The device of claim 1 wherein the detector circuit comprises:
    a shift register with a serial input coupled to the data valid output of the decoder; and
    a short pulse decoder with parallel inputs coupled to parallel outputs of the shift register.

5. The device of claim 4 wherein the shift register includes three parallel outputs and the short pulse decoder includes three parallel inputs.

6. The device of claim 5 wherein the short pulse decoder asserts the output signal upon determination that the three parallel outputs of the shift register have values of "010" or "101".

7. The device of claim 4 wherein the short pulse decoder includes four parallel inputs and asserts an output as follows:
    if the four parallel inputs are 0000 then the output is 0;
    if the four parallel inputs are 0001 then the output is 0;
    if the four parallel inputs are 0010 then the output is 1;
    if the four parallel inputs are 0011 then the output is 0;
    if the four parallel inputs are 0100 then the output is 1;
    if the four parallel inputs are 0101 then the output is 1;
    if the four parallel inputs are 0110 then the output is 1;
    if the four parallel inputs are 0111 then the output is 0;
    if the four parallel inputs are 1000 then the output is 0;
    if the four parallel inputs are 1001 then the output is 1;
    if the four parallel inputs are 1010 then the output is 1;
    if the four parallel inputs are 1011 then the output is 1;
    if the four parallel inputs are 1100 then the output is 0;
    if the four parallel inputs are 1101 then the output is 1;
    if the four parallel inputs are 1110 then the output is 0; and
    if the four parallel inputs are 1111 then the output is 0.

8. The device of claim 1 wherein the decoder comprises an 8b10b decoder.

9. A communication device comprising:
    an 8b10b decoder including a serial input, a data output and a data valid output, the 8b10b decoder configured to receive data at a packet rate, each packet including more than one word so that the packet rate is less than a word rate;
    an out-of-sync detector with an input coupled to the data valid output of the 8b10b decoder, the out-of-sync detector asserting an output signal at an output upon determination that a signal carried on the data valid output changes values at a rate higher than the packet rate;
    a synchronization request generator with an input coupled to the output of the out-of-sync detector;
    an 8b10b encoder with a first input coupled to an output of the synchronization request generator; and
    a system protocol generator with a first output coupled to a second input of the encoder and with a second output coupled to the synchronization request generator.

10. The device of claim 9 wherein the out-of-sync detector includes a finite impulse response high-pass digital filter.

11. The device of claim 9 wherein the out-of-sync detector circuit comprises:
    a shift register with a serial input coupled to the data valid output of the 8b10b decoder; and
    a short pulse decoder with parallel inputs coupled to parallel outputs of the shift register.

12. The device of claim 9 wherein the synchronization request generator comprises an idle code generator.

13. A method of resynchronizing a serial bit receiver, the method comprising:
    receiving serial bit information from a serial line, the serial bit information arranged in packets, each packet including at least two words, so that a packet rate is less than a word rate for the serial bit information;
    determining that the serial bit information includes errors by determining that a signal carried on a data valid output changes at a rate higher than the packet rate;
    for each determination that the serial bit information includes errors, generating a code, the code being less than a full packet in length;
    transmitting the code to a remote communication device;
    receiving a synchronization request command from the remote communication device; and
    resynchronizing the serial bit information in response to the synchronization request command.

14. The method of claim 13 wherein the serial bit information has been encoded using a 8b10 code.

15. The method of claim 14 where generating a code comprises generating a short idle code.

16. The method of claim 13 wherein transmitting the code comprises interspersing the code between data words of a packet.

17. A method of communicating serial data, the method comprising:
- receiving serial bit information from a serial line, the serial bit information arranged in packets, each packet including at least two words, so that a packet rate is less than a word rate for the serial bit information;
- determining that the serial bit information includes errors by determining that a signal carried on a data valid output changes at a rate higher than the packet rate,
- for each determination that the serial bit information includes errors, generating a code, the code being less than a full packet in length;
- transmitting the code to a remote communication device;
- receiving the code at the remote communication device;
- recognizing that the code is less than a full packet in length;
- in response to the recognition that the code is less than a full packet in length, generating a synchronization request command;
- transmitting the synchronization request command from the remote communication device;
- receiving the synchronization request command; and
- resynchronizing the serial bit information.

18. The method of claim 17 wherein the serial bit information has been encoded using a 8b10 code.

19. The method of claim 17 wherein the code bits comprise a short idle code.

20. The method of claim 17 wherein the synchronization request command comprises an idle command.

21. A computer system comprising:
- a processor coupled to a processor bus;
- memory coupled to the processor;
- a first bridge circuit coupled between the processor bus and an expansion bus;
- a serializer coupled between the expansion bus and a serial bus, the serializer including a decoder that asserts a valid data signal upon receipt of valid data and a detector circuit that asserts an output signal upon determination that the valid data signal changes values at a rate higher than a packet rate, the packet rate being a rate less than word rate at which the serializer generates words.

22. The system of claim 21 wherein the expansion bus comprises a PCI bus and wherein the serializer is part of a PCI-to-PCI bridge.

23. The system of claim 21 wherein the computer system comprises a portable computer system.

24. The system of claim 23 in combination with a docking station, the docking station including a second serializer.

25. The system of claim 24 wherein the second serializer includes circuitry identical to that of the serializer.

* * * * *